United States Patent Office 3,390,607
Patented July 2, 1968

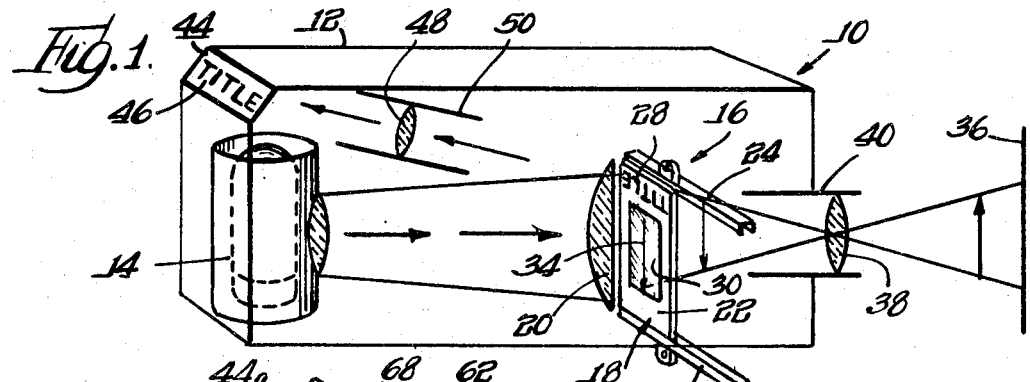
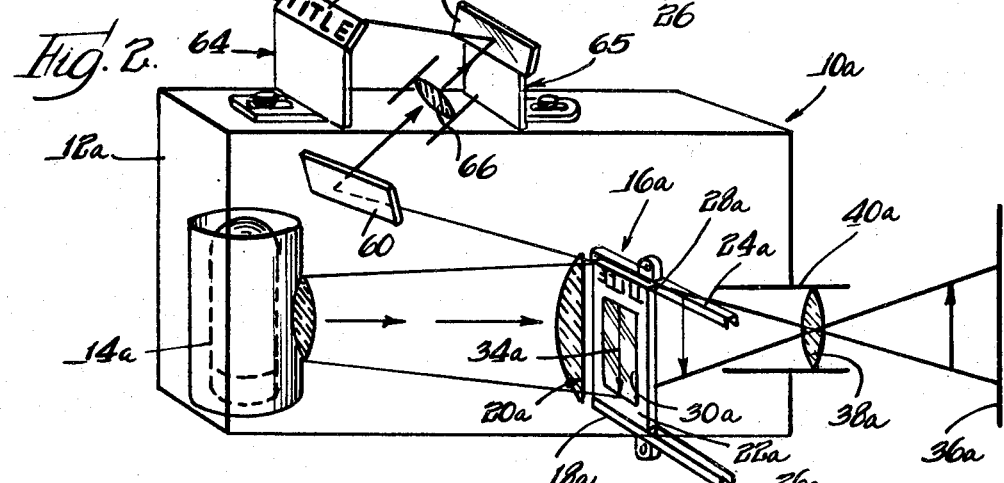
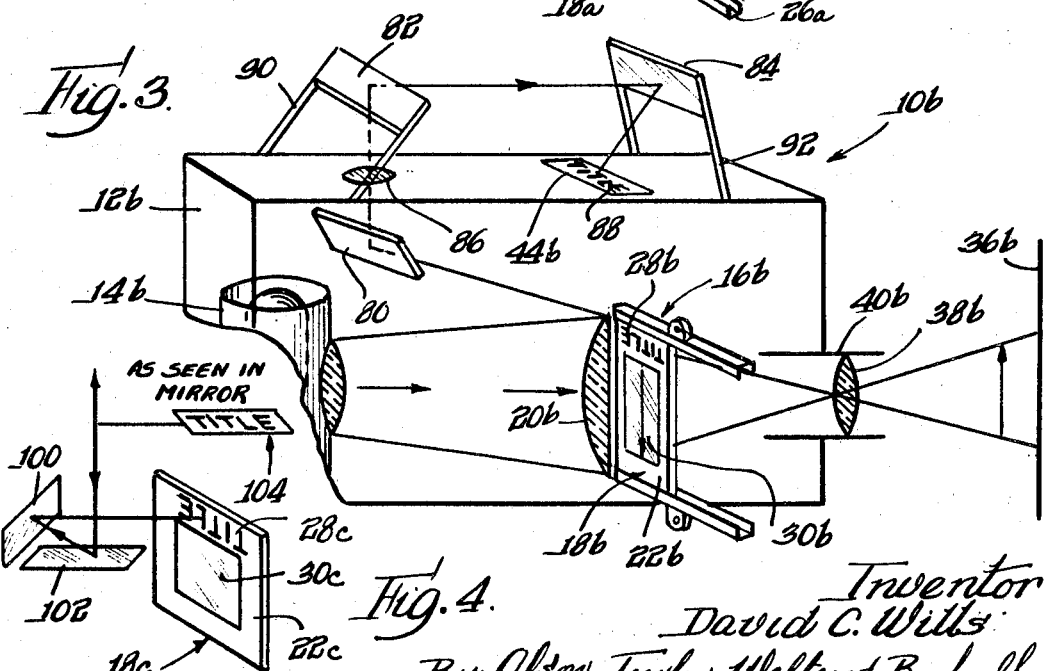

3,390,607
TITLE VIEWER FOR SLIDE PROJECTOR
David C. Wills, Riverside, Ill., assignor to General Aniline & Film Corporation, New York, N.Y., a corporation of Delaware
Continuation-in-part of application Ser. No. 374,991, June 15, 1964. This application May 23, 1966, Ser. No. 552,022
10 Claims. (Cl. 88—24)

ABSTRACT OF THE DISCLOSURE

A slide projector having an auxiliary optical system for displaying to the operator a title impressed on the opaque frame of the slide being projected.

The present invention relates broadly to slide projectors; and more specifically to a novel title viewer for a slide projector to project an identifying title or mark on the frame of a photographic slide to an auxiliary operator's viewing screen. This application is a continuation-in-part of application Ser. No. 374,991, filed June 15, 1964, now abandoned.

The problem and deficiencies of the prior art

The slide projectors to which this invention relates are generally well known. In their simpler forms, such projectors include a source of light, an opening for the receipt of a slide transparency such as a 35 mm. transparent photographic view, a collecting lens to collect light rays from the source and to brightly illuminate the slide transparency, and an objective lens to project a magnified image of the slide transparency view to a forward screen.

One problem commonly encountered in the use of such a slide projector is the problem of identifying a particular slide view. The slide projector operator may have previously written identifying titles on the cardboard rim about the transparent portion of the slide; however, since slides are usually projected in a darkened room, it is extremely difficult, if not impossible, for the operator to read such identifying titles.

As will be appreciated, this problem of properly identifying a particular slide view can be extremely exasperating, delaying the operator, annoying the viewers and adversely affecting the enjoyment of the viewers and operator.

One solution to the above problem would be for the operator to make out a written list identifying each slide by number and with an identifying title so that he could properly inform those watching the slide showing as to the identity of a particular picture viewed. Unfortunately, such a written list presents additional problems: the slides must be in proper numerical sequence; and light is required for the operator to read his written list.

If it were possible to provide some means for projecting an image of an identifying title written on the cardboard portion of the slides to a small auxiliary screen for use of the operator in identifying a particular slide, such means would be highly desirable, enhancing the enjoyment of the slide show and avoiding much annoyance and consumption of time.

Objects of the invention

Thus, a general object of this invention is to provide novel title viewing means for use with conventional slide projectors.

It is a further object to provide novel means in a slide projector for projecting an identifying mark on a slide frame or holder to an auxiliary operator's title viewer, simultaneously with the projection of the slide transparency.

It is a further object to provide a title viewer for conventional slide projectors that can be incorporated in existing conventional slide projectors or adapted for use with such projectors.

A related object is to provide an auxiliary operator's viewing screen upon which an identifying title of a slide may be projected.

A more specific object is to provide a title projection system for projection and viewing of an identifying photographic slide title, utilizing the same source of light as that used in projecting the slide image with the identifying title projected to an auxiliary screen in upright position.

A related object is to provide such a device having an auxiliary viewing screen that is not readily observable by others than the operator of the slide projector.

These and other objects and advantages of the invention will appear from the following description taken in conjunction with the appended claims and drawings, wherein:

FIG. 1 is a schematic illustration of a projector in which a first embodiment of a title projection and viewing means is mounted;

FIG. 2 is a schematic illustration of a second embodiment of the title projection and viewing means wherein mirrors are used for projecting an image of the title onto a display means or viewing screen;

FIG. 3 is a schematic view of a third embodiment of my invention wherein a combination of mirrors is arranged to project an image of a title for a slide onto a display means or screen mounted on the projector; and FIG. 4 is a schematic view of a fourth embodiment of my invention wherein the mirrors are utilized as a title display means.

Description of the invention

Referring now to the drawings in greater detail, there is shown in FIG. 1 a schematic illustration of a projector 10 which forms a preferred embodiment of my invention. The projector 10 includes an outer casing or housing 12 in which a source of light 14 is mounted. A slide positioning means 16 is mounted on the housing 12 to retain a slide 18 in a substantially vertical position in a path of light rays emanating from the light source 14. A collecting or condensing lens 20 is mounted in the housing 12 between the light source 14 and the slide positioning means 16. The condensing lens 20 focuses the light rays from the source 14 onto the slide 18.

The slide 18 includes a rigid outer frame 22, of paperboard or other suitable material, which is held in positioning tracks or guides 24 and 26 of the slide positioning means 16. The positioning means 16 holds the slide for illumination by light from the source 14. Title indicia 28, or other suitable marking, is inscribed on the frame 22 to identify a transparent subject portion 30 of the slide member 18. It is contemplated that the title indicia will be either printed on the opaque paperboard frame when the slide is fabricated or, if desired, the title indicia 28 could be hand written on the paperboard frame 22 by a photographer after the slide 18 has been fabricated. It will be apparent to those skilled in the art that there are many ways of forming a suitable title indicia or marking to identify the transparent subject portion 30 of the slide member 22.

For purposes of illustration, the transparent subject portion 30 is shown as depicting an arrow 34. A first group of light rays from the light source 14 will travel through the transparent subject portion 30 to project an image of the arrow 34 on a main screen 36. The main screen 36 is positioned in front of the projector 10 for viewing by both an audience and the operator of the projector. An objective lens 38 is mounted in an adjustable sleeve or aperture 40 in a well known manner, to invert and focus the image of the arrow in an upright position on the main screen 36.

A second group of light rays from the source 14 illuminate the title indicia 28 on the frame 22 of the slide member. Since the paperboard frame 22 is opaque, the second group of light rays are reflected by the frame rearwardly, onto an auxiliary screen or other suitable display means 44 to form an image 46 of the title indicia 28. The auxiliary title display screen 44 is securely mounted on the housing 12 for viewing by the operator of the projector. An auxiliary title projecting lens 48 is mounted in the housing 12 on a frame 50 to invert and focus the image of the title indicia 28 so that the image 46 appears in a normal vertical relationship. It should be noted that the first group of light rays from the light source 14 are projected through the transparent subject portion 30 of the slide member 18 to form an image on the main viewing screen 36 in the usual manner. However, the second group of light rays from the light source 14 are reflected by the opaque title portion of the slide member 22 onto the auxiliary title display screen 44.

In view of the foregoing remarks, it will be apparent that the auxiliary title display screen 44 permits the operator of the projector 10 to view the image 46 of the title indicia 28. The image of the title indicia 28 is not visible to an audience. The audience can see only an image of the main subject portion 30 of the slide member 18 on the main viewing screen 36. Also, the image 46 of the title indicia 28 is formed on the auxiliary title display screen 44 substantially simultaneously with the forming of an image of the subject portion 30 on the main viewing screen 36. Therefore, when an image of the subject portion of the slide member is formed on the main viewing screen 36, the operator is able to view an image of the title indicia to facilitate identification of the image formed on the main screen.

In order to enhance the understanding of the invention, two modified forms are shown in FIGS. 2, 3 and 4. In these modified forms of the invention, like numerals have been used to designate like parts with the suffix letter "a" being employed to distinguish the elements associated with FIG. 2, the suffix letter "b" being employed to distinguish the elements associated with FIG. 3, and the suffix letter "c" being employed to distinguish the elements associated with FIG. 4. Referring now to FIG. 2, a projector 10a is shown in which a light source 14a is mounted. A slide member 18a having a transparent subject portion 30a and an opaque frame 22a is positioned in the projector housing or casing 12a. As previously explained, a first group of light rays from the light source 14a is projected through the transparent subject portion 30a of the slide member to form an image on the main screen 36a for viewing by the audience. A second group of light rays is reflected by an opaque title indicia portion of the frame 22a onto a mirror 60. The image from the mirror 60 is reflected upwardly onto a second mirror 62 and finally onto an auxiliary title display screen 44a.

The auxiliary title display screen 44a is supported above the projector casing 12a by a suitable frame 64. In a similar manner the mirror 62 is also supported above the projector casing by a frame 65. An auxiliary focusing lens 66 is mounted in an upper wall of the projector casing 12a to focus an image 68 of the title indicia 28a on the auxiliary title display screen 44a.

In the embodiment shown in FIG. 2, the auxiliary title display screen 44a is selectively movable by the operator relative to the projector casing 12a. The mirror 62 is also movable on the frame 65 relative to the projector casing 12a to reflect an image of the title indicia 28a onto the screen 44a. Since both the auxiliary title display screen 44a and the mirror 62 are movable relative to the projector casing 12a, an operator can position the auxiliary display screen to facilitate focusing and viewing of the image 68 of the title indicia 28a. It will be apparent to those skilled in the art that, if desired, the auxiliary title display screen 44a and focusing lens 66 can be eliminated and an image of the title indicia 28a viewed directly in the mirror 62.

Referring now to FIG. 3, a projector 10b is shown for projecting an image of a transparent subject portion 30b of a slide 18b onto a main viewing screen 36b. An image of the title indicia 28b is reflected rearwardly onto a mirror 80 which is mounted in the projector casing or housing 12b. The image of the title indicia 28b is reflected by the mirror 80 onto a second mirror 82 which is positioned to reflect the image onto still another mirror 84. The mirror 84 reflects the image of the title indicia 28b downwardly onto an auxiliary title display screen 44b which is mounted on an upper surface of the housing or casing 12b. An auxiliary focusing lens 86 is mounted in the upper surface of the housing 12b to focus an image 88 on the auxiliary title display screen 44b.

It is contemplated that the mirror 82 will be rigidly mounted on the casing 12b by the frame 90. In a similar manner the mirror 84 will be mounted on the casing 12b by the frame 92. With the positioning arrangement shown in FIG. 3, it will be apparent that the image 88 of the title indicia 28b can be viewed, with the lens 86 removed, directly in the mirror 82.

Referring now to FIG. 4, there is shown a schematic view of a slide member 18c which is mounted in a projector, not shown, similar to the projectors 10 of FIGS. 1 to 3. The slide member 18c includes an opaque frame 22c of paperboard or other suitable material, on which title indicia 28c has been formed. The slide member 18c is illuminated by a light source, similar to the light source 14 of FIGS. 1 to 3. An image of the title indicia 28c is reflected onto a first mirror 100 and then downwardly onto a second mirror 102. An image of the title indicia 28c is formed on the mirror 102 and will appear to an operator of the projector as indicated at 104. It should be noted that the embodiment of the invention set forth in FIG. 4 eliminates the need for an auxiliary title projecting lens and a screen member as utilized in the embodiments of FIGS. 1 to 3. However, as previously mentioned, it will be apparent to those skilled in the art, that the embodiments of FIGS. 1 to 3 could, if desired, be modified to eliminate the auxiliary title display screens 44 and the auxiliary title projecting lenses.

For purposes of affording a more complete understanding of the invention, it is advantageous now to provide a functional description of the mode in which the component parts thus far identified cooperate. When a slide member 18 is mounted in the projector 10, a first group of light rays from the source 14 will be transmitted through the transparent subject portion 30 of the slide member and onto a main viewing screen 36. An image of the subject portion will be displayed on the screen 36 for viewing by both the operator of the projector and an audience. Simultaneously with this projecting of the image of the subject portion 30 onto the main screen 36, an image of the title indicia 28 on the opaque paperboard frame 22 of the slide member will be projected onto an auxiliary title display screen 44. The auxiliary title display screen 44 is visible to only the operator of the projector to facilitate the operator's identification of an image formed on the main viewing screen 36.

The use of an auxiliary title display screen 44 enables the operator of the projector to determine at a glance the title of the subject matter of the slide member 18. This identification of the slide member can be made without fumbling in the dark for a flashlight or other light source to illuminate the slide member before it is placed in the projector. Therefore, the annoyance to the audience, and inconvenience to the operator of the projector is held to a minimum. While an auxiliary display screen has been shown in the embodiments of FIGS. 1 to 3 for viewing an image of the title indicia 28, it will be apparent that the image could equally as well be viewed in a mirror or other display means without projecting it onto a screen. It will also be apparent that instead of lettered printing, as shown in FIGS. 1 to 3, the title indicia could, if desired, be in the form of a symbol, drawing, or other indicia.

In the illustrated embodiments of the invention an opaque paperboard frame 22 is utilized for mounting the title indicia 28. It is contemplated that the title indicia 28 could be placed on a transparent portion of the slide member, illuminaed by an auxiliary source of light, and reflected by a mirror onto the auxiliary title display screen. It is also contemplated that the title indicia could, if desired, be placed on the forward side of the slide member and illuminated by an auxiliary light source, rather than by the main light source 14. Therefore, while particular embodiments of the invention have been shown, it should be understood, of course, that the invention is not limited thereto since many modifications may be made; and it is, therefore, contemplated to cover by the appended claims any such modifications as fall within the true spirit and scope of the invention.

What is claimed is:

1. A projector assembly including: a housing; a light source mounted in said housing, said light source emanating a first and a second group of light rays; slide positioning means mounted on said housing; title display means associated with said housing, said title display means being located in a position for viewing by an operator of the projector; and a slide member supported by said slide positioning means, said slide member including a subject portion through which said first group of light rays pass to form an image of said subject portion on a subject display means, and a title portion identifying said subject portion, said title portion reflecting said second group of light rays to produce an image of said title portion on said title display means for identifying said image of said subject portion of said slide member, said slide member including an opaque frame means and said subject portion being made of a transparent material supported by said frame means and said title portion being positioned on said opaque frame means.

2. An assembly as set forth in claim 1 wherein; said title display means includes a screen member supported by said housing.

3. A projector assembly as set forth in claim 1 wherein; said image of said subject portion of said slide member is formed on the subject display means simultaneously with the forming of the image of said title portion on said title display means.

4. A projector assembly as set forth in claim 3 wherein; said subject portion of said slide member is transparent and said title portion of said slide member is opaque.

5. A projector assembly comprising: a housing; a light source mounted in said housing; a slide positioning means mounted adjacent to said light source; a slide member having a frame means supported by said slide positioning means for illumination by light from said light source, said slide member including a first subject portion supported by said frame means and a second opaque title portion positioned on said frame means; an aperture means through which an image of said first subject portion may be projected onto a main screen for viewing; and an auxiliary display means associated with said housing for displaying an image of said second title portion to identify said first subject portion of said slide member, said frame means being formed of an opaque material for reflecting light onto said auxiliary display means.

6. A projector assembly as set forth in claim 5 and further including a first optical system through which the image of said first subject portion is projected, and an auxiliary optical system disposed at an acute angle to said first optical system and positioned rearwardly thereof for projecting the image of said second title portion on said auxiliary display means.

7. A projector assembly as set forth in claim 5 wherein; said auxiliary display means includes mirror means for displaying said image of said title portion.

8. A projector assembly for a slide having a subject identified by a title on an opaque frame of the slide comprising: a projector casing, a light source mounted in said projector casing, a slide positioning means supported by said projector casing adjacent to said light source for supporting the slide for illumination by said light source, an aperture means in said casing through which an image of the subject of said slide is projected onto a subject display means, and a title display means associated with said projector casing on which an image of the title on the opaque frame of the slide is reflected.

9. A projector assembly as set forth in claim 8 wherein; said title display means includes screen supported by said projector casing on which the image of the title is formed simultaneously with the forming of the image of the subject of the slide on the subject display means.

10. A slide projector combination comprising: a housing, a light source mounted in said housing, condensing and objective lenses mounted in said housing for directing the light from said source, a slide member having a transparent subject portion and an opaque frame on which indicia for identifying said subject portion may be positioned, a slide holder supported by said housing to position said slide member for illumination by said light source, and an indicia display means supported by said housing, said indicia display means including an auxiliary screen and an optical system, said optical system being so arranged to focus an image of a portion of the opaque frame of the slide and indicia appearing thereon onto said auxiliary screen simultaneously with the projection of an image of a transparent subject portion onto a main screen through said objective lens.

References Cited

UNITED STATES PATENTS

| | | | |
|---|---|---|---|
| 2,089,703 | 8/1937 | May | 88—24 XR |
| 2,120,596 | 6/1938 | Avey | 88—24 XR |
| 2,746,345 | 7/1956 | Graves | 88—24 XR |
| 3,002,426 | 10/1961 | McCabe | 88—26 |
| 3,045,541 | 7/1962 | Bregman | 88—26 XR |

NORTON ANSHER, *Primary Examiner.*

RICHARD M. SHEER, *Assistant Examiner.*